US011738316B2

(12) United States Patent
Sauer et al.

(10) Patent No.: US 11,738,316 B2
(45) Date of Patent: Aug. 29, 2023

(54) METHOD FOR FILLING REACTORS AND FOR EXAMINING CATALYTIC REACTORS

(71) Applicant: hte GmbH the high throughput experimentation company, Heidelberg (DE)

(72) Inventors: Tilman Sauer, Heidelberg (DE); Veit Hoehn, Penzberg (DE); Marcus Roth, Mannheim (DE); Benjamin Rupp, Heidelberg (DE); Thomas Schrapel, Plankstadt (DE); Andreas Strasser, Ludwigshafen (DE)

(73) Assignee: HTE GMBH THE HIGH THROUGHPUT EXPERIMENTATION, Heidelberg (DE)

( * ) Notice: Subject to any disclaimer, the term of this patent is extended or adjusted under 35 U.S.C. 154(b) by 0 days.

(21) Appl. No.: 17/642,679

(22) PCT Filed: Sep. 11, 2020

(86) PCT No.: PCT/EP2020/075497
§ 371 (c)(1),
(2) Date: Mar. 12, 2022

(87) PCT Pub. No.: WO2021/048373
PCT Pub. Date: Mar. 18, 2021

(65) Prior Publication Data
US 2022/0323920 A1 Oct. 13, 2022

(30) Foreign Application Priority Data
Sep. 13, 2019 (DE) .................... 10 2019 214 017.3

(51) Int. Cl.
*B01J 8/00* (2006.01)
*B01J 8/06* (2006.01)
*B01J 8/02* (2006.01)
(52) U.S. Cl.
CPC ............. *B01J 8/0015* (2013.01); *B01J 8/001* (2013.01); *B01J 8/0292* (2013.01); *B01J 8/06* (2013.01);
(Continued)
(58) Field of Classification Search
CPC ... B01J 8/0015; B01J 8/003; B01J 8/06; B01J 2208/00654; B01J 2208/00752; B01J 2208/00725; B01J 2208/06
See application file for complete search history.

(56) References Cited

U.S. PATENT DOCUMENTS 7,118,917 B2 10/2006 Bergh et al.
2001/0041117 A1 11/2001 Comardo
(Continued)

FOREIGN PATENT DOCUMENTS

DE 102004023249 A1 3/2005
DE 102005013845 A1 9/2006
(Continued)

OTHER PUBLICATIONS

International Search Report and Written Opinion dated Nov. 5, 2020, on application No. PCT/EP2020/075497.
(Continued)

*Primary Examiner* — Lessanework Seifu
(74) *Attorney, Agent, or Firm* — Lowenstein Sandler LLP (57) ABSTRACT

Disclosed are methods of assistance and documentation of a filling of tubular reactors including recording of filling materials and fill levels of filling materials and documenting the filling materials used, fill levels and results of a catalysis process of tubular reactors produced in such a way.

17 Claims, 7 Drawing Sheets

(52) U.S. Cl.
CPC .......... *B01J 2208/00654* (2013.01); *B01J 2208/00725* (2013.01); *B01J 2208/00752* (2013.01)

(56) References Cited

U.S. PATENT DOCUMENTS

| | | |
|---|---|---|
| 2009/0308138 A1 | 12/2009 | Fischer et al. |
| 2010/0063304 A1 | 3/2010 | Olbert et al. |
| 2011/0131930 A1 | 6/2011 | Cavalcanti et al. |
| 2011/0283666 A1 | 11/2011 | Johns et al. |

FOREIGN PATENT DOCUMENTS

| | | |
|---|---|---|
| EP | 1796897 B1 | 8/2010 |
| WO | 2013175240 A1 | 11/2013 |

OTHER PUBLICATIONS

Lee, Robert, "Statistical Design of Experiments for Screening and Optimization", Chemical Engineering Technology, 2019, 91, No. 3, pp. 191-200, 10 pages.
German Search Report dated Aug. 6, 2020, on application No. DE 10 2019 214 017.3, 10 pages.
German Examination Report dated Aug. 6, 2020, on application No. DE 10 2019 214 017.3, 10 pages.

METHOD FOR FILLING REACTORS AND FOR EXAMINING CATALYTIC REACTORS

FIELD OF THE INVENTION

The invention relates to a method of assistance and documentation of a filling of tubular reactors comprising recording of filling materials and fill levels of filling materials and documenting the filling materials used, fill levels and results of a catalysis process of tubular reactors produced in such a way, and to a method and an apparatus for examining catalysts and to the use of a relational database for recording and evaluation of data or measurement data.

BACKGROUND OF THE INVENTION

In high-throughput research, reactors, especially tubular reactors, are tested for their efficacy. Tubular reactors have a filling of materials that are different to some degree. The filling material is often in a powder form. However, a powder is of relatively undefined density. Therefore, the pulverulent material is compacted after being introduced into the tubular reactor. It is important here that the parameters are ascertained in a defined manner, especially when the filling is a multilayer bed. It is possible here to identify, weigh and ascertain the volume of the filling materials. For efficient and reliable implementation of test runs, it is necessary to provide reproducible test conditions. It is helpful here to assist the user in the test runs for production of reactors and to document the runs.

WO 2013/175240 describes a method of producing a product that is said to meet or surpass the properties expected by the user, wherein an algorithm is used to optimize the method. The method described in WO 2013/175240 is a flow system, with the analysis system adapted to the flow system.

U.S. Pat. No. 7,118,917 B2 describes an apparatus in which a multitude of reactors in a parallel arrangement can be heated and/or cooled separately with individual temperature control elements.

EP 1 796 897 B1 describes an apparatus and a method for controlled compaction of particle beds in tubular reactors that are subjected to a mechanical compaction treatment.

The present invention provides an apparatus and a method that improve function tests and especially the function tests in the form of catalytic test studies with respect to the methods known from the prior art.

SUMMARY OF THE INVENTION

The present invention relates to a method and to an apparatus for assistance and documentation of a filling of tubular reactors according to the independent claims; further embodiments of the invention are embodied in the pending claims.

In one embodiment of the invention, a method is provided for assistance and documentation of a filling of tubular reactors, comprising: recording of a user selection of a filling plan for an arrangement of tubular reactors; recording of an amount of a first filling material with which a tubular reactor from the arrangement of tubular reactors has been filled; recording of a fill level height of the first filling material with which a tubular reactor from the arrangement of tubular reactors has been filled; recording of an amount of a second filling material with which a tubular reactor from the arrangement of tubular reactors has been filled; recording of a fill level height of the second filling material with which a tubular reactor from the arrangement of tubular reactors has been filled; recording of a fill level height of a total height of all filling materials in the respective tubular reactor; assigning of the recorded amounts of filling material and the recorded fill level heights in a data basis; and performing a catalysis process in the respective tubular reactor and correlating a result of the catalysis process with the recorded amounts of filling material and the recorded fill level heights in the data basis.

In this way, a user is assisted in the production of one or more tubular reactors, and the actions, whether those of the user or those of the system, are documented. This documentation can serve as a basis for assistance of a later production, for instance as a knowledge data basis.

In one embodiment of the invention, after the recording of a fill level height of the second filling material and before the recording of a fill level height of a total height, there is a definable number of instances of recording of an amount of a further filling material with which a tubular reactor from the arrangement of tubular reactors has been filled, and recording of a fill level height of the further filling material with which a tubular reactor from the arrangement of tubular reactors has been filled.

In this way, it is possible to alter the filling pattern in the filling of multiple reactors. More particularly, it is possible, for example, first to introduce a first filling material into all reactors, optionally to compact it and to ascertain the fill level height thereof before filling with a second filling material. This may be of relevance especially when, in the case of a changeover of the filling material, a treatment, for example cleaning, of the filling device is necessary.

In one embodiment of the invention, between the recording of an amount of the respective filling material and the recording of a fill level height of the respective filling material, a compacting of the respective filling material is actuated.

In this way, it is possible to assure a defined density of the filling material introduced, especially in the case of pulverulent filling materials. The compaction can be effected with a compacting ram, which especially has a compaction face which is flat and is orthogonal to the longitudinal extent of the tubular reactor or the inner side wall. This establishes defined interfaces between adjacent filling materials.

In one embodiment of the invention, recording of an amount of the respective filling material comprises a recording of a user statement of the amount of the respective filling material or a recording of a measurement from a metering device for metering in an amount of the respective filling material.

In this way, the crucial data can be ascertained either by a user or by the system and supplied to the method as information.

In one embodiment of the invention, recording of a fill level height comprises a recording of a user statement of the fill level height or a recording of a measurement from a fill level height measuring device for measuring of a fill level height.

In this way, the crucial data can be ascertained either by a user or by the system and supplied to the method as information.

In one embodiment of the invention, recording of a user selection of a filling plan for an arrangement of tubular reactors comprises recording of a filling plan created by a user for an arrangement of tubular reactors.

In this way, an individualized filling plan or one created directly by the user can also serve as basis for the method.

In one embodiment of the invention, after recording of a fill level height, a report is made to the user as to whether the recorded fill level height corresponds to an expected fill level height, on the basis of the amount of filling materials, a compaction coefficient of the respective filling material(s) and a compaction pressure.

In this way, a user is able to obtain a direct report as to a likelihood of success and is optionally able to take measures before the tubular reactors have been completed.

In one embodiment of the invention, after recording of a fill level height, this value is compared with a definable tolerance from the filling plan and, in the event that the value is below the tolerance, further material previously introduced is metered in, or, in the event of exceedance of the tolerance, the material previously introduced is removed in order to arrive within a definable tolerance field.

In this way, automated fill volume adjustment and more exact production of tubular reactors are possible.

In one embodiment of the invention, a method for assistance and documentation of a filling of at least one first tubular reactor and a second tubular reactor is provided, in which the recording of an amount of a second filling material with which the first tubular reactor from the arrangement of tubular reactors has been filled is preceded by recording of an amount of a first filling material with which the first tubular reactor from the arrangement of tubular reactors has been filled, recording of a fill level height of the first filling material with which the first tubular reactor from the arrangement of tubular reactors has been filled, recording of an amount of a first filling material with which the second tubular reactor from the arrangement of tubular reactors has been filled, and recording of a fill level height of the first filling material with which the second tubular reactor from the arrangement of tubular reactors has been filled.

In this way, it is possible to make a sequence of filling of tubular reactors more efficient, especially since a first filling material is first introduced into a multitude of reactors before a second filling material is introduced. This dispenses with possible cleaning operations and other actions that have to be taken between a changeover of the filling material.

In one embodiment of the invention, the method further comprises positioning of an insert element in the respective tubular reactor, wherein the insert element is selected from a group consisting of a catalyst rest, a porous shaped body, a glass wool plug, a glass wool disk, ceramic beads and a substructure, wherein filling materials are introduced especially into that region of the tubular reactors that is in the center of the tubular reactors, with the length of a tubular reactor segment to be filled with filling material being especially in the range from 5 to 500 mm, especially in the range from 15 to 350 mm.

In this way, as well as pourable and/or pulverulent filling materials, it is also possible to introduce solid-state elements into the reactor that can fulfill a particular function in the reactor which can possibly not be fulfilled by a pulverulent filling material.

In one embodiment of the invention, the method comprises a visualized representation of a marking showing a lower and an upper target position of a target window arranged at right angles to the longitudinal axis of the respective tubular reactor, indicating the recorded fill height and a desired fill height.

In this way, the user can be shown the filling state in the tubular reactor directly, even if the tubular reactor cannot be directly inspected by the user.

In one embodiment of the invention, the apparatus for assistance and documentation of a filling of tubular reactors is designed to execute a method of assistance and documentation of a filling of tubular reactors according to the above description, comprising: user selection recording device for recording a user selection of a filling plan for an arrangement of tubular reactors; filling material volume recording device for recording an amount of a filling material with which a tubular reactor from the arrangement of tubular reactors has been filled; fill level height recording device for recording a fill level height of a single filling material and a total height of all filling materials with which a tubular reactor from the arrangement of tubular reactors has been filled; data processing device for assignment of the recorded amounts of filling material and the recorded fill level heights in a data basis, wherein the data processing device is designed to correlate a result of a catalysis process with the recorded amounts of filling material and the recorded fill level heights in the data basis.

In this way, it is possible to provide an apparatus or a system that works according to the method and assists the user in the production of one or more tubular reactors and documents the actions.

In one embodiment of the invention, the apparatus comprises a catalysis process apparatus designed to conduct a catalysis process in a respective tubular reactor and correlate results of the catalysis process with the recorded amounts of filling material and the recorded fill level heights in the data basis.

In this way, it is also possible to undertake catalysis directly in order to ascertain the properties of the tubular reactors produced that can serve as a basis for the data basis.

In one embodiment of the invention, the apparatus further comprises: a filling device with a weighing device for recording and filling the respective tubular reactor with a filling material; a mechanical compacting device for compacting the filling material introduced in the respective tubular reactor; and a fill level measuring device for recording a fill level height of the respective filling material or an entirety of the filling materials in the respective tubular reactor, wherein the compacting device and the fill level height measuring device are especially designed to fill tubular reactors having a length in the range from 10 to 250 cm, especially in the range from 15 to 150 cm, especially in the range of 20-100 cm, and an internal diameter in the range from 4 to 100 mm, especially in the range from 7 to 60 mm, especially in the range from 7 to 40 mm.

In this way, not only is assistance and documentation possible, but also handling of the production steps themselves.

In one embodiment of the invention, the apparatus further comprises a pressure testing device for testing the pressure resistance of the entirety of the compacted filling materials.

In this way, it is possible to analyze a ready-produced tubular reactor and examine whether the ready-compressed column of filling materials has properties consistent with the individual measurement steps for the individual filling materials.

In one embodiment of the invention, the apparatus comprises a positioning device designed to position insert elements in the respective tubular reactors, wherein the insert elements are selected from a group consisting of a catalyst rest, a porous shaped body, a glass wool plug, a glass wool disk and ceramic beads.

In this way, defined introduction of solid-state items or shaped body elements into the tubular reactor is also possible.

In one embodiment of the invention, the data basis also includes historical test data with a correlation between the filling materials, the corresponding fill level heights and associated catalysis process results, wherein the data basis especially includes an algorithm for running a self-learning process from supplied data of filling materials, the corresponding fill level heights and associated catalysis process results, and especially includes artificial intelligence.

In this way, it is possible to utilize experience from earlier experiments and tests in order to assist the user in the production of tubular reactors. By means of artificial intelligence, it is possible to establish a greater correlation between the parameters measured and the properties or test results of the tubular reactors.

In one embodiment of the invention, a method of filling reactors is provided, comprising: selecting a filling plan and/or creating a filling plan for an arrangement of reactors, implementing and monitoring the filling operation, registering interim results and results of the filling operation in a database, wherein the reactors are equipped with pulverulent materials, wherein the number of reactors in this arrangement is in the range of 1 to 100 reactors, especially in the range from 2 to 80 reactors, especially in the range from 4 to 40 reactors.

In one embodiment of the invention, the pulverulent materials are arranged in multiple layers in the reactors, with the layers being of different composition.

In one embodiment of the invention, a graphical screen representation is provided, showing the arrangement of the reactors or the arrangement of a group of the arrangement of the reactors, wherein the graphical representation especially also includes the display of the material layers introduced into the individual reactors.

In one embodiment of the invention, the graphical representation comprises a marking showing a lower and an upper target position of a target window arranged at right angles to the longitudinal axis, with the representation especially indicating the measured fill height and the desired fill height.

In one embodiment of the invention, the method is computer-implemented.

In one embodiment of the invention, a system for filling of reactors is provided, wherein the system comprises a filling device with precision balance, a fill level measuring device, a mechanical compacting device and a pressure testing device.

In one embodiment of the invention, the apparatus is connected to a computer and a database.

In one embodiment of the invention, the reactors intended for filling have a length in the range from 10 to 250 cm, especially in the range from 15 to 150 cm, especially in the range from 20 to 100 cm, where the internal diameter of the reactors is in the range from 4 to 100 mm, especially in the range from 7 to 60 mm, especially in the range from 7 to 40 mm.

In one embodiment of the invention, the system for filling of reactors comprises one or more insert elements selected from the group of catalyst rest, porous shaped body, glass wool plug, glass wool disk, ceramic beads.

In one embodiment of the invention, a method of filling reactors using an above-described system is provided, wherein the method comprises: (i) filling reactor with pulverulent material with performance of a weighing, (ii) fill height determination, especially with a laser measuring device, (iii) mechanical compaction, and (iv) pressure test, wherein the sequence in the performance of the steps can be varied, wherein the performance of the pressure test in step (iv) is conducted at a conclusion of the filling operation, wherein the performance of the fill height determination in step (ii) precedes and/or follows the performance of the mechanical compaction in step (iii); wherein steps (i)-(iv) are performed for each reactor of an arrangement of reactors.

In one embodiment of the invention, the method comprises the arrangement of a catalyst rest and/or a substructure in the reactors of the arrangement.

In one embodiment of the invention, the positioning of a catalyst rest and/or a substructure in the reactors of the arrangement comprises introducing the material envisaged for filling or the materials envisaged for filling into that region of the reactors which is in the center of the reactors, where the length of the reactor segment to be filled with filling material is in the range from 5 to 500 mm, especially in the range from 15 to 350 mm.

In one embodiment of the invention, the method comprises subjecting the arrangement of the filled reactors to a performance of function tests, wherein the function tests are especially conducted by means of an apparatus for testing catalysts, wherein the data achieved by means of the function tests are correlated with those characterization data that were determined in the filling operation by the method described above.

These and other features are elucidated by the description of figures that follows.

Further features and advantages of the methods of the invention and of the apparatus are apparent from the figures

DETAILED DESCRIPTION OF ILLUSTRATIVE EMBODIMENTS

According to the invention, a method of filling reactors is provided, especially with a relational database for assessment of process data from catalytic test studies. The method can be used in conjunction with the evaluation of process data that have been generated by means of high-throughput apparatuses.

The parameters for filling of the reactors are stored in a database; preferably, the data stored can be represented either in graphical or in tabular form. The values of the catalytic test studies are likewise stored in a database. There is a correlation between the databases, such that the properties of reactor fillings, the filling parameters and catalytic data is given. An assessment of the catalytic test studies is undertaken, which are compared with the values of the filling and the filling parameters. It is possible to specifically ascertain differences connected with filling. By means of the method and the associated database, it is possible to store a large number of datasets and also to compare different study results from different test series.

The filling operation is complex and hence sensitive to variations. Pulverulent particles can separate. Electrostatic charging can disrupt the filling process. Disruption by electrostatic charging is reduced to some degree in that the pulverulent catalysts are introduced into the reactors with a certain residual moisture content. Residual moisture content can be determined in the performance of the method, such that the amount of residual moisture in the weighing and the performance of the method can be taken into account.

Also of significance is the mixing-in of inert materials in pulverulent form or the creation of mixtures of catalyst material and inert materials. The mixing-in of inert materials may be used when particularly small amounts of pulverulent catalyst sample are available. It is possible to select different inert materials that also differ from one another, for example, in particle size. Inert particles may, for example, be silicon carbide in pulverulent form. The inert particles may take the form of different samples with different particle sizes and particle size distributions. Particle size is reported as the average particle size, and the particle size distribution says that a particular proportion of particles may lie within a given size range. For example, the particle size distribution may be in the range from 50 to 150 μm, or in the range from 250 to 500 μm. Through the selection of particle size and the size distribution and the amount of inert material added, it is possible to control the pressure drop over the reactor bed within certain limits.

Apart from that, it is also possible to embed extrudates into inert particle beds. Extrudates are shaped bodies having greater dimensions than the dimensions of pulverulent beds. It should be noted here that it is also often possible to use microextrudates in reactors having small internal volumes. Small internal volumes are those reactors having a diameter of 10 mm.

A powder bed in the uncompacted state differs from a powder bed in the compacted state in that the powder bed in the uncompacted state fills a greater volume in the reactor space. The uncompacted beds often have low stability. Mechanical compaction of the powder bed is intended to convert this to a state such that the bed after the compaction adopts a stable state that is not disrupted by outside influences.

However, the filling of pulverulent materials relates to the arrangement of small amounts of powders in reactors, the interiors of which are accessible only via the tube ends. The arrangement of support devices on which the pulverulent materials are layered in the reactor tube is often possible only with high accuracy. In this regard, it is possible to dispose catalyst rests or porous shelves in the tubes that are fixed on special tube edges that have been incorporated into the interior of the tubes. In addition, it should be noted that the reactors are frequently made of metal, the effect of which is that it is not possible to tell the exact position of the material introduced into the reactor. For example, the material introduced into the reactor may have a hollow, or a slope, such that the pulverulent material does not lie in a plane. The mechanical compaction also comprises a process such that the particle bed is distributed uniformly and the surface of the bed forms a plane-parallel level arranged at right angles to the axis of the reactor tube.

A further aspect of the method of the invention relates to the arrangement of layer structures or multistage layers within a single reactor.

Multistage filling of a reactor exists when multiple beds of different composition are arranged in a reactor. Multistage fillings are more troublesome since there can be mixing of the materials in the region of the interfaces.

In a further aspect, the data from the catalytic studies are evaluated in relation to the position of the reactors in the apparatus for testing of catalysts.

In one embodiment, the method comprises an editor in which target parameters for performance of the filling are recorded, where these parameters are selected from the group of material parameters, type of material, average particle diameter, particle size distribution, and bed height. The target parameters may be used as a basis for a formulation that serves as assistance to the user in the production of tubular reactors.

In a further embodiment, the method also comprises a characterization of the filled reactor after the performance of the function test and the recording of the data ascertained here in a database. The catalyst material present in the reactor after the performance of the function test is a deactivated catalyst material that has attained a certain degree of wear in association with the performance of the function test. The catalyst material obtained after deinstallation is also referred to as deinstalled catalyst, which can then be supplied to a dedicated solid-state characterization that may comprise, for example, characterization methods such as surface analysis ($N_2$ adsorption), crystal structure analysis, chemical analysis. It is in no way ruled out here that the deinstallation of the catalyst material can be undertaken in layers.

In one embodiment of the method of the invention, characterization of the filled reactors can be undertaken by means of x-radiation. The characterization of the filled reactors by means of x-radiation can be conducted in addition to the pressure test. The data of this characterization can be stored in the database. The characterization by means of x-radiation gives information with regard to the homogeneity of beds and as to whether there may be any mixing of individual bed zones in the boundary regions of beds.

The term "reaction tube" or "liner" is also used for the term "reactor".

Figure 1:
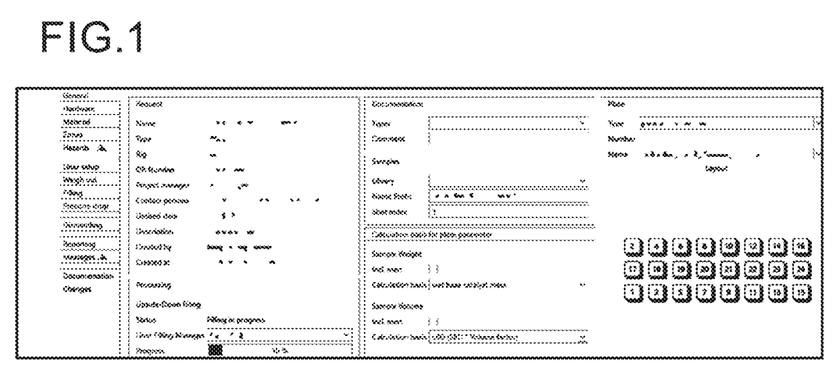
FIG. 1 shows a screenshot of an input mask for input of experimental parameters in one embodiment of the invention.

FIG. 1 shows a schematic diagram of the screen with the display of the editor or of the input mask for input of the experimental parameters selected from the group of material sample, documentation, selected test device for performance of the catalytic test studies, and also a matrix representation of the reactor positions in what is called a 3x8 configuration.

Figure 2:
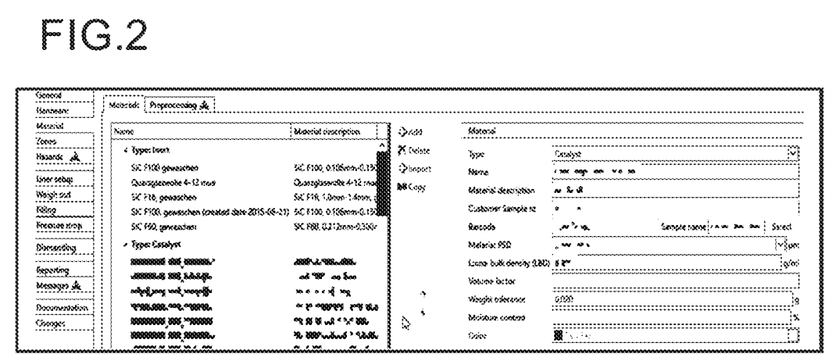
FIG. 2 shows a screenshot with the display of the material parameters in one embodiment of the invention.

FIG. 2 shows a schematic diagram of the screen with the display of the material parameters in relation to the inert materials and the description of the selected sample materials.

Figure 3:
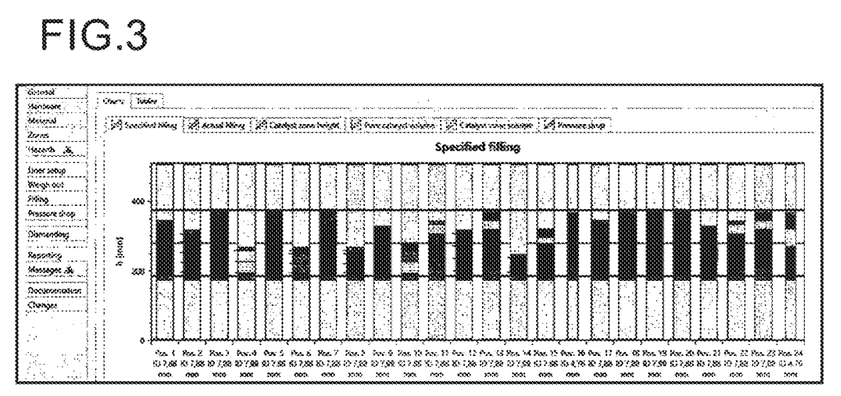
FIG. 3 shows a schematic diagram of a set comprising 24 reactors provided for a filling in one embodiment of the invention.

FIG. 3 shows a schematic diagram of a set with 24 reactors intended for filling together with the figures for the dimensions of the reactors and the filling state, with both the measured and the predicted fill level being displayed or representable.

Figure 4:
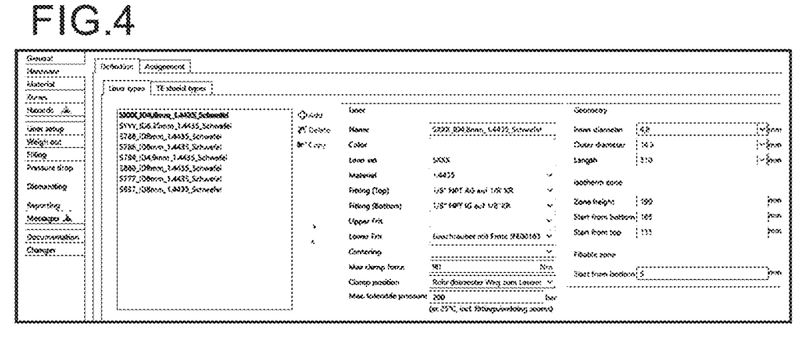
FIG. 4 shows a screenshot with parameter data for selected reactors with bed within a reactor in one embodiment of the invention.

FIG. 4 shows a schematic diagram of the screen with the parameter details for the selected reactors and the positioning of the bed within a selected reactor, or the mask with the input of parameters for a selected reactor.

Figure 5:
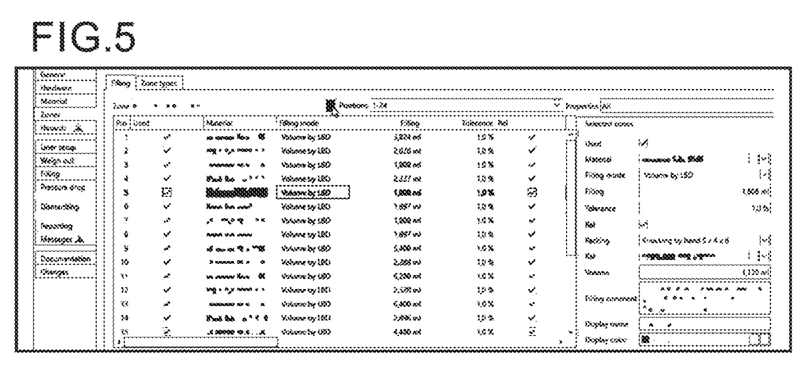
FIG. 5 shows a screenshot with the specification of the filling of a material in the different reactors in one embodiment of the invention.

FIG. 5 shows a schematic diagram of the screen with the specification of the filling of a material in the different reactors that are provided for the positions with numbers 1 to 15, and the filling volumes in the individual reactors.

Figure 6:
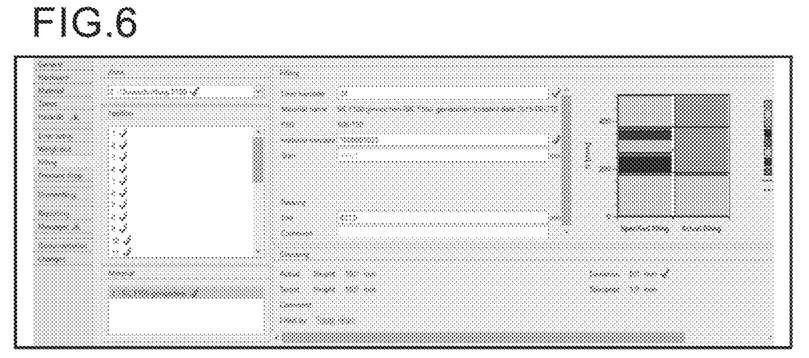
FIG. 6 shows a screenshot with the specification of the characteristic data for filling of a single reactor in one embodiment of the invention.

FIG. 6 shows a schematic diagram of the screen with a statement of the characteristic data for filling of a single reactor together with a graphical representation of the associated selected reactor with the user-specified filling and the actual filling.

Figure 7:
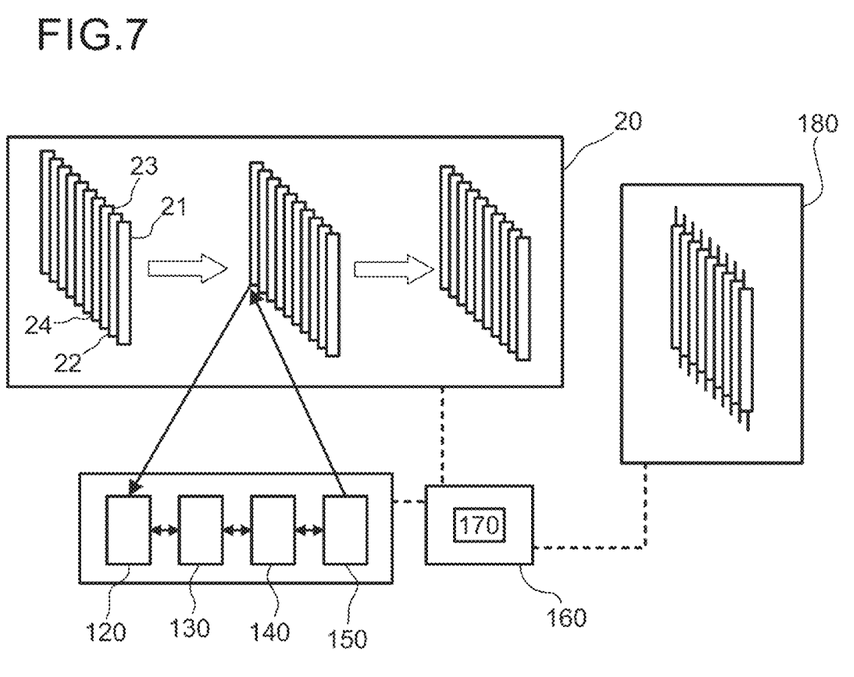
FIG. 7 shows a schematic diagram of the sequence of a filling method for a group of ten reactors in one embodiment of the invention.

FIG. 7 shows a schematic diagram of the sequence of a filling method for reactor arrangement 20 with a group of ten reactors 21, 22, 23, 24 that are supplied to the steps of the filling process, with storage of the data of the filling process in a database or data basis 170; the filled reactors are used in an apparatus for testing of catalysts 180 and subjected to a catalytic testing, wherein the results of the testing, after processing in a data processing device 160, are stored in the database or data basis 170 that comprises the data for filling of the reactors. The system or the apparatus 100 has a user selection recording device 110, a filling material volume recording device 120, a mechanical compaction device 130 and a fill level height recording device 140, and in the embodiment shown here a pressure testing device 150.

Figure 8:
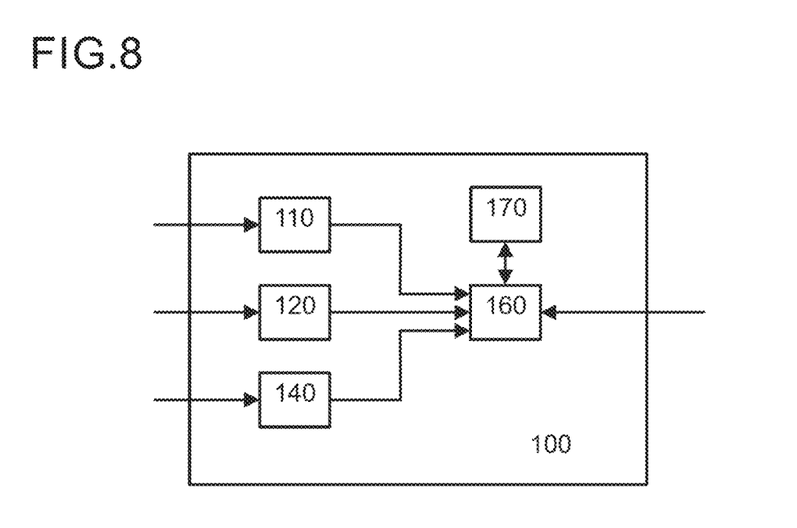
FIG. 8 shows a schematic diagram of the apparatus in one embodiment of the invention.

FIG. 8 shows the schematic construction of the system with the communication flows. The components correspond to those of FIG. 7 with the same reference numerals.

Figure 9:
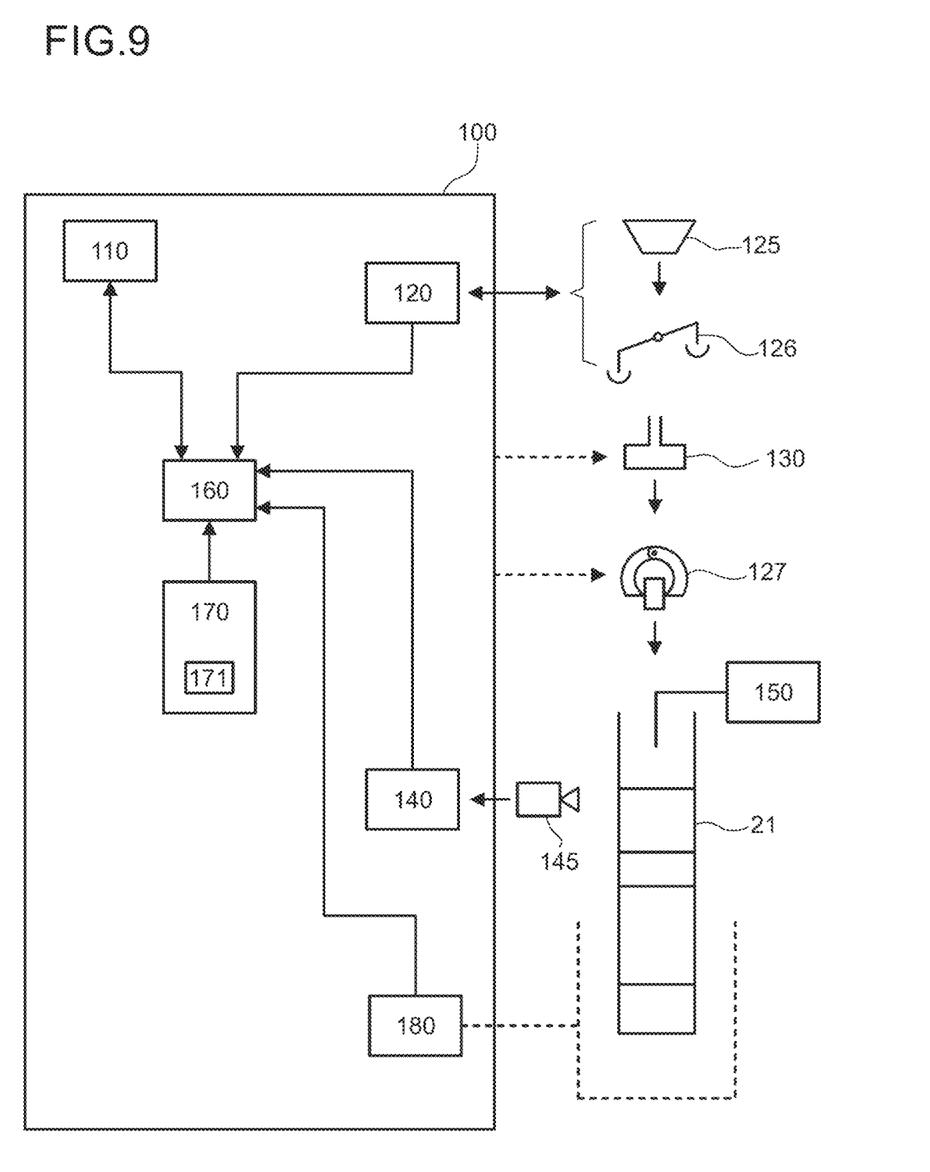
FIG. 9 shows a more detailed diagram of the apparatus in one embodiment of the invention.

FIG. 9 shows a detailed diagram of the apparatus 100. The apparatus 100 for assistance and documentation of a tubular reactor production has a user selection recording device 110 for recording of the user inputs. This can also serve for outputs to the user. Also provided is a filling material volume recording device 120 that detects fill volumes, for instance via user input or via data received from a filling device 125. This may also include data from a weighing device 126. The data processing device 160 receives data from the filling material volume recording device 120 and the user selection recording device 110, and from a fill level height recording device 140. This can either record user inputs relating to the fill level height or data from a fill level measuring device 145. In addition, a positioning device 127 may be provided for positioning of construction components of a tubular reactor, which is actuated, for example, by the apparatus 100. Moreover, a mechanical compaction device may be provided, which compacts the filling material introduced in the reactor 21. Actuation can be effected by the apparatus 100. Furthermore, a pressure test device 150 may be provided, which undertakes pressure testing of the ready-filled reactor. The data may be stored in a data basis or database 170. It is possible therein to provide a kind of artificial intelligence 171 that can establish a correlation between the production parameters and the properties of the tubular reactors 21 measured by a catalysis process apparatus 180.

Figure 10:
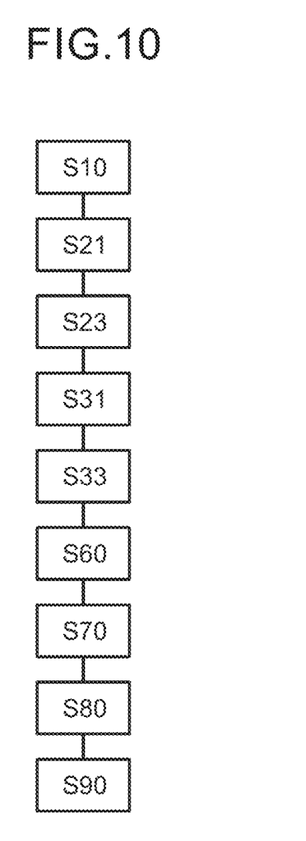
FIG. 10 shows a sequence of the method in one embodiment of the invention.

FIG. 10 shows a sequence of the method in one embodiment of the invention, in which a fill volume and a fill level of two filling materials S21, S23, S31, S33 are ascertained before recording of a fill level height S60 of a total height, assignment in a data basis S70 of the parameters recorded for the reactors, and performance of a catalysis process S80. A visualized representation of the fill height S90 may optionally be undertaken.

Figure 11:
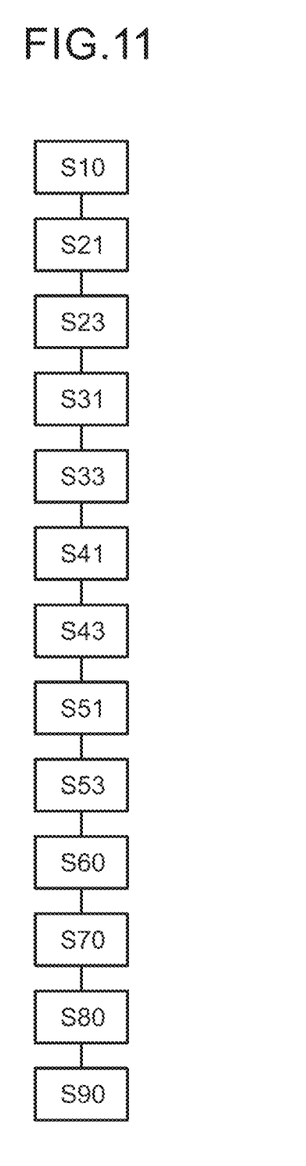
FIG. 11 shows a sequence of the method with filling operations for multiple filling materials in a further embodiment of the invention.

FIG. 11 shows a sequence of the method with filling operations for multiple filling materials in a further embodiment of the invention, in which, by way of example, a fill volume and a fill level of four filling materials are ascertained S21, S23, S31, S33, S41, S43, S51, S53, before recording of a fill level height S60 of a total height, assignment in a data basis S70 of the parameters recorded for the reactors, and performance of a catalysis process S80. A visualized representation of the fill height S90 may optionally be undertaken.

Figure 12:
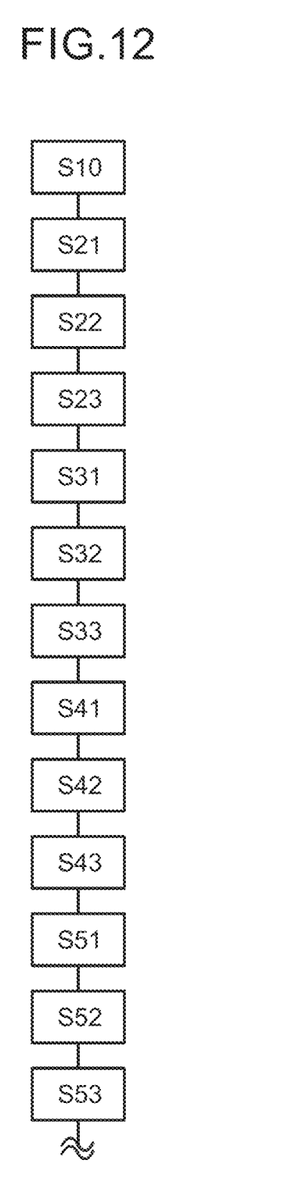
FIG. 12 shows a sequence of the method in a further embodiment of the invention with a compaction.

FIG. 12 shows a sequence of the method in a further embodiment of the invention comprising a compacting in which, between the recording of a fill volume S21, S31, S41, S51 on the one hand and the recording of a fill height S23, S33, S43, S53 on the other hand, a compacting S22, S32, S42, S52, especially by mechanical means, is effected in each case before recording of a fill level height S60 of a total height, assignment in a data basis S70 of the parameters recorded for the reactors, and performance of a catalysis process S80. A visualized representation of the fill height S90 may optionally be undertaken.

Figure 13:
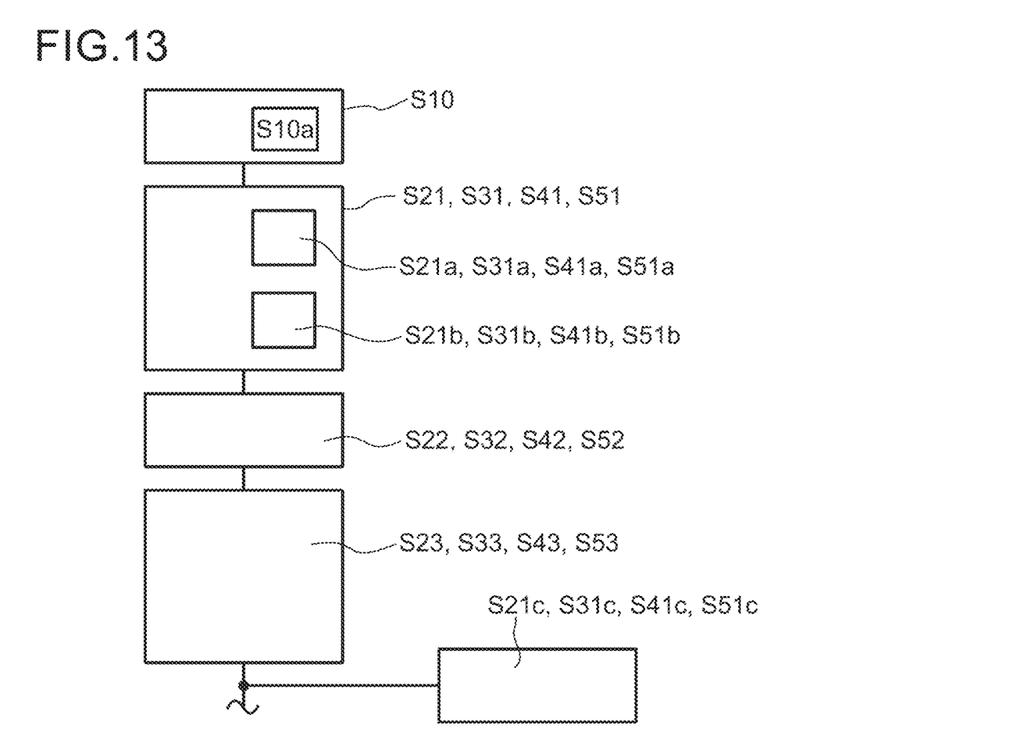
FIG. 13 shows a sequence of the method with a recording of a user input or of a measurement in one embodiment of the invention.

FIG. 13 shows a sequence of the method comprising a recording of a user input or a measurement in one embodiment of the invention, in which the recording of a fill volume S21, S31, S41, S51 comprises a recording of a user input S21a, S31a, S41a, S51a and/or a detecting of a measurement from a measurement device S21b, S31b, S41b, S51b. In a detection of the user input and of the measurement from a measurement device, it is possible to compare the two values with one another and, in the event of a significant variance, to issue a warning. Additionally or optionally, after the recording of the fill level height S23, S33, S43, S53, it is possible to issue a report relating to a fill level height to the user S21c, S31c, S41c, S51c. Additionally or optionally, although not shown here, in the recording of a fill height S23, S33, S43, S53, it is possible to record a user input and/or to record a measurement from a measurement device. Here too, it is possible to undertake a comparison of these recordings and optionally to give a warning in the event of a significant variance.

Figure 14:
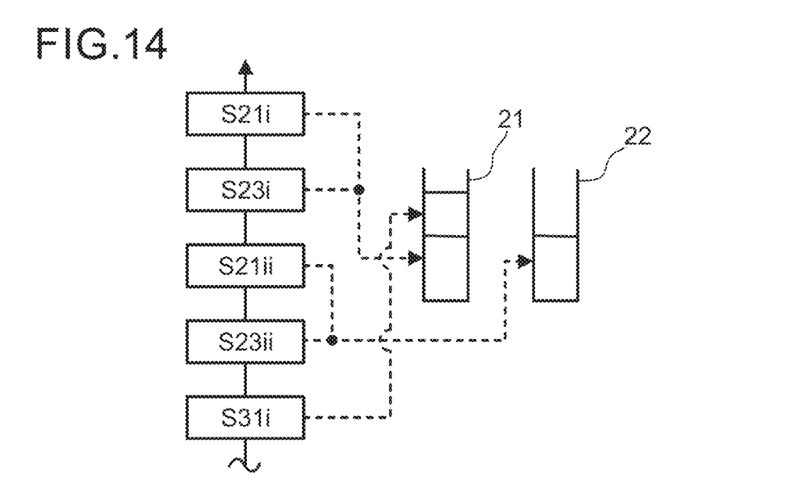
FIG. 14 shows a sequence of the method with a modified bed sequence in one embodiment of the invention.

FIG. 14 shows a sequence of the method with a modified bed sequence in one embodiment of the invention, in which there is firstly a filling with a first filling material S21i and a recording of a fill level height S23i of a first reactor 21, and a filling with a first filling material S21ii and a recording of a fill level height S23ii of a second reactor 22, before filling S31i with a second filling material.

Figure 15:
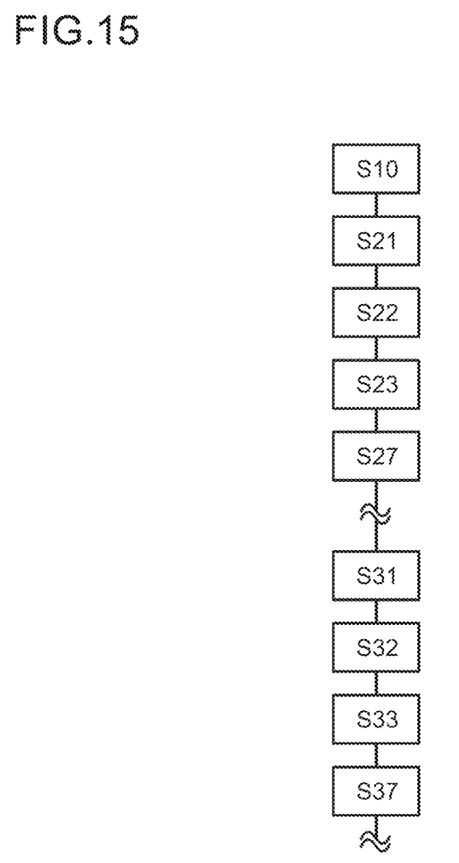
FIG. 15 shows a sequence of the method with positioning of a catalyst rest in a further embodiment of the invention.

FIG. 15 shows a sequence of the method with a positioning S27, S37 of a catalyst rest in a further embodiment of the invention, in which, after a recording of a fill volume of a first filling material S21, a compacting S22 and a recording of a fill level height S23, there is a positioning S27 of a catalyst rest, for example, and then, in the embodiment shown here, there is a recording of a fill volume of a second filling material S31, a compacting S32 and a recording of a fill level height S33, a positioning S37 of a further catalyst rest.

LIST OF REFERENCE DESIGNATIONS 20 reactor arrangement, tubular reactor arrangement
21, 22, 23, 24 first, second, third, fourth, reactor/tubular reactor
100 apparatus for assistance and documentation of a tubular reactor production
110 user selection recording device
120 filling material volume recording device
125 filling device
126 weighing device
127 positioning device
130 mechanical compacting device
140 fill level height recording device
145 fill level measuring device
150 pressure testing device
160 data processing device
170 data basis
171 artificial intelligence
180 catalysis process apparatus
S10 recording of a selection of a filling plan by a user
S10a recording of a filling plan created by the user
S21, S31, S41, S51 recording of an amount of a first filling material
S21/31/41/51a recording of a user input
S21/31/41/51b recording of a measurement
S21/31/41/51c report relating to fill level height to the user
S21i recording of an amount of a first filling material for first reactor
S21ii recording of an amount of a first filling material for second reactor
S22, S32, S42, S52 compacting of a filling material
S23, S33, S43, S53 recording of a fill level height of a filling material
S23i recording of fill level height of the first filling material for first reactor
S23ii recording of fill level height of the first filling material for second reactor
S27, S37 positioning of an insert element
S31i recording of an amount of a second filling material for first reactor
S60 recording of a fill level height of a total height
S70 assignment in a data basis
S80 performing of a catalysis process
S90 visualized representation of the fill height

What is claimed is:

1. A method of assisting and documenting a filling of tubular reactors, comprising:
 recording of a user selection of a filling plan for an arrangement of tubular reactors;
 recording of an amount of a first filling material with which a tubular reactor from the arrangement of tubular reactors has been filled;
 recording of a fill level height of the first filling material with which a tubular reactor from the arrangement of tubular reactors has been filled;
 recording of an amount of a second filling material with which a tubular reactor from the arrangement of tubular reactors has been filled;
 recording of a fill level height of the second filling material with which a tubular reactor from the arrangement of tubular reactors has been filled;
 recording of a fill level height of a total height of all filling materials in the respective tubular reactor;
 assigning of the recorded amounts of filling material and the recorded fill level heights in a data basis;
 performing a catalysis process in the respective tubular reactor and correlating a result of the catalysis process with the recorded amounts of filling material and the recorded fill level heights in the data basis.

2. The method according to claim 1, wherein, after the recording of a fill level height of the second filling material and before the recording of a fill level height of a total height, there is a definable number of instances of recording of an amount of a further filling material with which a tubular reactor from the arrangement of tubular reactors has been filled, and recording of a fill level height of the further filling material with which a tubular reactor from the arrangement of tubular reactors has been filled.

3. The method according to claim 1, wherein, between the recording of an amount of the respective filling material and the recording of a fill level height of the respective filling material, a compacting of the respective filling material is actuated.

4. The method according to claim 1, wherein recording of an amount of the respective filling material comprises a recording of a user statement of the amount of the respective filling material or a recording of a measurement from a metering device for metering in an amount of the respective filling material.

5. The method according to preceding claim 1, wherein recording of a fill level height comprises a recording of a user statement of the fill level height or a recording of a measurement from a fill level height measuring device for measuring of a fill level height.

6. The method according to claim 1, wherein recording of a user selection of a filling plan for an arrangement of tubular reactors comprises recording of a filling plan created by a user for an arrangement of tubular reactors.

7. The method according to claim 1, wherein, after recording of a fill level height, a report is made to the user as to whether the recorded fill level height corresponds to an expected fill level height, on the basis of the amount of filling materials, a compaction coefficient of the respective filling material(s) and a compaction pressure.

8. The method according to claim 1, wherein the method comprises:
 assistance and documentation of a filling of at least one first tubular reactor and one second tubular reactor, wherein the recording of an amount of a second filling material with which the first tubular reactor from the arrangement of tubular reactors has been filled is preceded by recording of an amount of a first filling material with which the first tubular reactor from the arrangement of tubular reactors has been filled,
 recording of a fill level height of the first filling material with which the first tubular reactor from the arrangement of tubular reactors has been filled,
 recording of an amount of a first filling material with which the second tubular reactor from the arrangement of tubular reactors has been filled, and
 recording of a fill level height of the first filling material with which the second tubular reactor from the arrangement of tubular reactors has been filled.

9. The method according to claim 1, wherein the method further comprises positioning of an insert element in the respective tubular reactor, wherein the insert element is selected from a group consisting of a catalyst rest, a porous shaped body, a glass wool plug, a glass wool disk, ceramic beads and a substructure, wherein filling materials are introduced especially into that region of the tubular reactors that is in the center of the tubular reactors, with the length of a tubular reactor segment to be filled with filling material being especially in the range from 5 to 500 mm.

10. The method according to claim 1, wherein the method comprises a visualized representation of a marking showing a lower and an upper target position of a target window arranged at right angles to the longitudinal axis of the respective tubular reactor, indicating the recorded fill height and a desired fill height.

11. The method according to claim 1, wherein, after recording of a fill level height, this value is compared with a definable tolerance from the filling plan and, in the event that the value is below the tolerance, further material previously introduced is metered in, or, in the event of exceedance of the tolerance, the material previously introduced is removed in order to arrive within a definable tolerance field.

12. An apparatus for assistance and documentation of a filling of tubular reactors, designed to perform a method of assistance and documentation of a filling of tubular reactors according to claim 1, comprising:
   user selection recording device for recording a user selection of a filling plan for an arrangement of tubular reactors;
   filling material volume recording device for recording an amount of a filling material with which a tubular reactor from the arrangement of tubular reactors has been filled;
fill level height recording device for recording a fill level height of a single filling material and a total height of all filling materials with which a tubular reactor from the arrangement of tubular reactors has been filled;
   data processing device for assignment of the recorded amounts of filling material and the recorded fill level heights in a data basis, wherein the data processing device is designed to correlate a result of a catalysis process with the recorded amounts of filling material and the recorded fill level heights in the data basis.

13. The apparatus according to claim 12, wherein the apparatus comprises a catalysis process apparatus designed to conduct a catalysis process in a respective tubular reactor and correlate results of the catalysis process with the recorded amounts of filling material and the recorded fill level heights in the data basis.

14. The apparatus according to claim 12, wherein the apparatus further comprises: a filling device with a weighing device for recording and filling the respective tubular reactor with a filling material; a mechanical compacting device for compacting the filling material introduced in the respective tubular reactor to form compacted filling materials; and a fill level measuring device for recording a fill level height of the respective filling material or an entirety of the filling materials in the respective tubular reactor, wherein the compacting device and the fill level height measuring device are especially designed to fill tubular reactors having a length in the range from 10 to 250 cm, and an internal diameter in the range from 4 to 100 mm.

15. The apparatus according to claim 14, wherein the apparatus further comprises a pressure testing device for testing the pressure resistance of the entirety of the compacted filling materials.

16. The apparatus according to claim 12, wherein the apparatus comprises a positioning device designed to position insert elements in the respective tubular reactors, wherein the insert elements are selected from a group consisting of a catalyst rest, a porous shaped body, a glass wool plug, a glass wool disk and ceramic beads.

17. The apparatus according to claim 12, wherein the data basis also includes historical test data with a correlation between the filling materials, the corresponding fill level heights and associated catalysis process results, wherein the data basis especially includes an algorithm for running a self-learning process from supplied data of filling materials, the corresponding fill level heights and associated catalysis process results, and especially includes artificial intelligence.

* * * * *